March 9, 1971 R. RIEDEL ET AL 3,568,215
TOILET AND SEWAGE TREATMENT APPARATUS
Filed Jan. 27, 1969 4 Sheets-Sheet 2

{ # United States Patent Office

3,568,215
Patented Mar. 9, 1971

---

3,568,215
TOILET AND SEWAGE TREATMENT APPARATUS
Rogers Riedel, Robert W. Norris, and Anthony Lepore, Belleville, Ontario, Canada; said Norris assignor to William E. Browning, Kingston, Ontario, Canada
Filed Jan. 27, 1969, Ser. No. 794,036
Claims priority, application Canada, Feb. 2, 1968, 11,446
Int. Cl. E03d 1/00
U.S. Cl. 4—10                                   4 Claims

ABSTRACT OF THE DISCLOSURE

A compact, combined toilet and sewage treatment apparatus in which sewage is treated electrolytically and excess fluids are evaporated from the electrolyte.

BACKGROUND OF THE INVENTION

This invention relates to a combined toilet (head) and sewage processing system which, due to its compact size, is particularly adapted for use in vehicles such as boats, aircraft and mobile homes.

There has been, and continues to be, a need for a compact and reliable toilet and sewage treatment system which is capable of discharging treated effluent which is sufficiently clean to permit its discharge onto the ground or into a lake or river without creating any pollution. The need for such a system has recently been substantially increased by reason of the fact that many areas of North America now prohibit the discharge of sewage, as for example from pleasure and commercial watercraft, if such discharge increases the level of pollution in the lake or river.

As a result, various systems have been proposed, and are used, but most of those considered acceptable by the authorities are systems which are generally known as holding-tank systems which are adapted to be discharged, not into the lake or river upon which the watercraft is operating, but rather by being pumped or otherwise emptied into a municipal sewage system at shore-side.

It would obviously be a significant advantage, if, rather than having to hold the sewage, it was possible to treat a major proportion of the sewage and discharge it, at an acceptable level of purity, into the lake or river upon which the craft was operating and in accordance with a broad aspect of the present invention, such a sewage treatment system is provided.

SUMMARY OF THE INVENTION

Accordingly there is provided by way of this invention a combined toilet and sewage treatment apparatus comprising a bowl provided with a drainage aperture; an electrolyte reservoir in fluid-flow communication with said bowl; means for circulating electrolyte between said bowl and said reservoir to flush said bowl, the electrolyte, during circulation, passing through said drainage aperture to said reservoir; a pair of electrodes positioned in said reservoir so that when current is supplied to said electrodes, electrolysis of sewage in the electrolyte occurs; and means for evaporating fluid from the electrolyte and discharging the evaporated fluid exteriorly of the apparatus.

BRIEF DESCRIPTION OF THE DRAWINGS

In the attached drawings showing a preferred embodiment of the present invention.

DESCRIPTION OF PREFERRED EMBODIMENT

Figure 1:
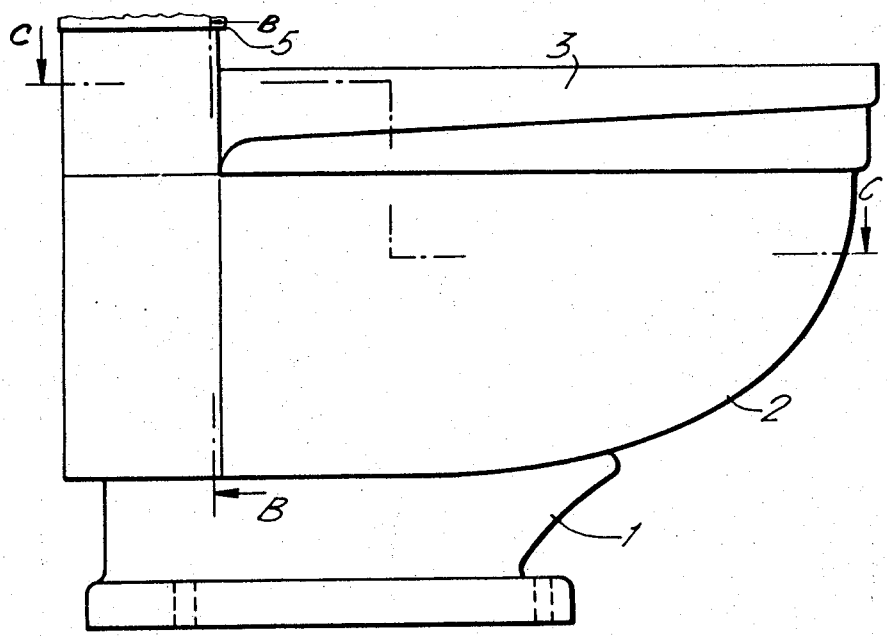
FIGS. 1, 2 and 3 are side, plan, and front views respectively of the preferred embodiment.
Figure 2:
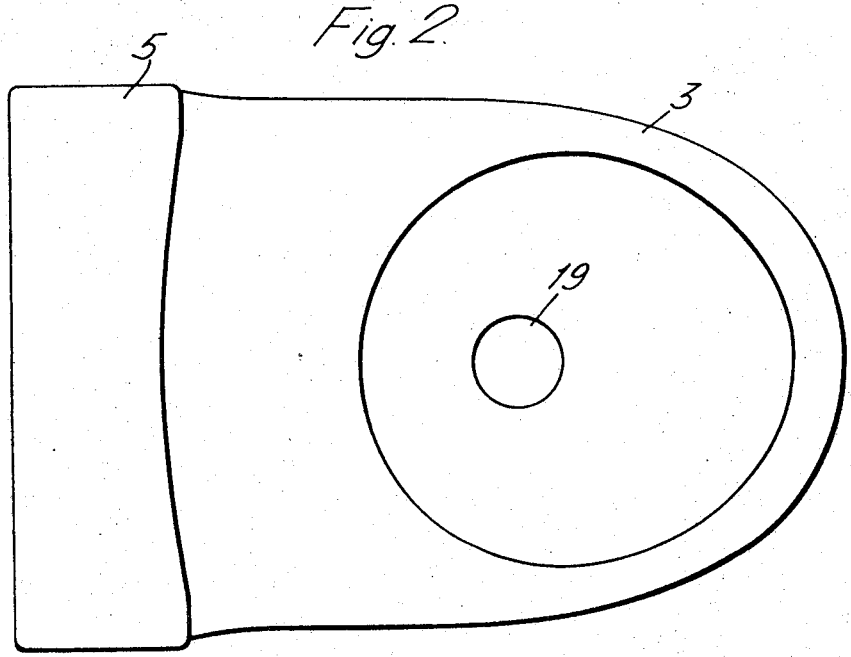
Figure 3:
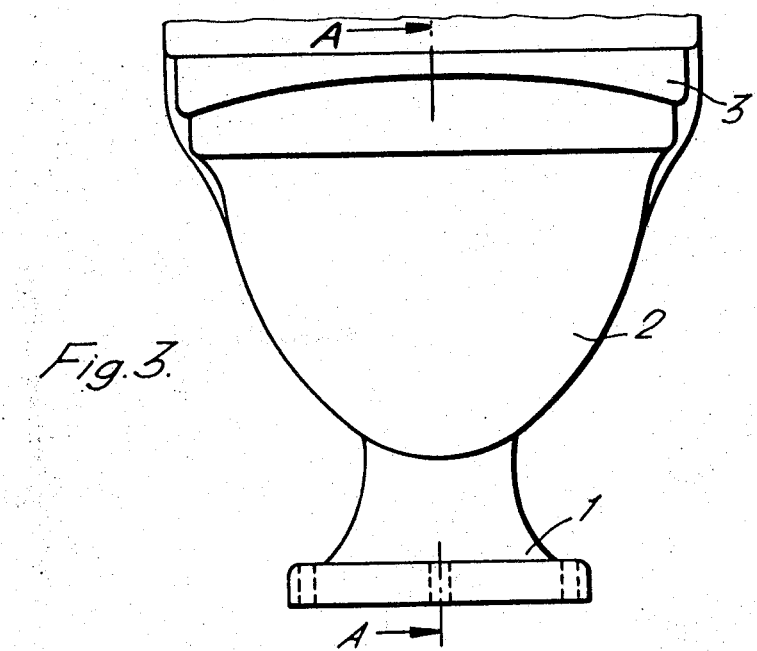
Figure 4:
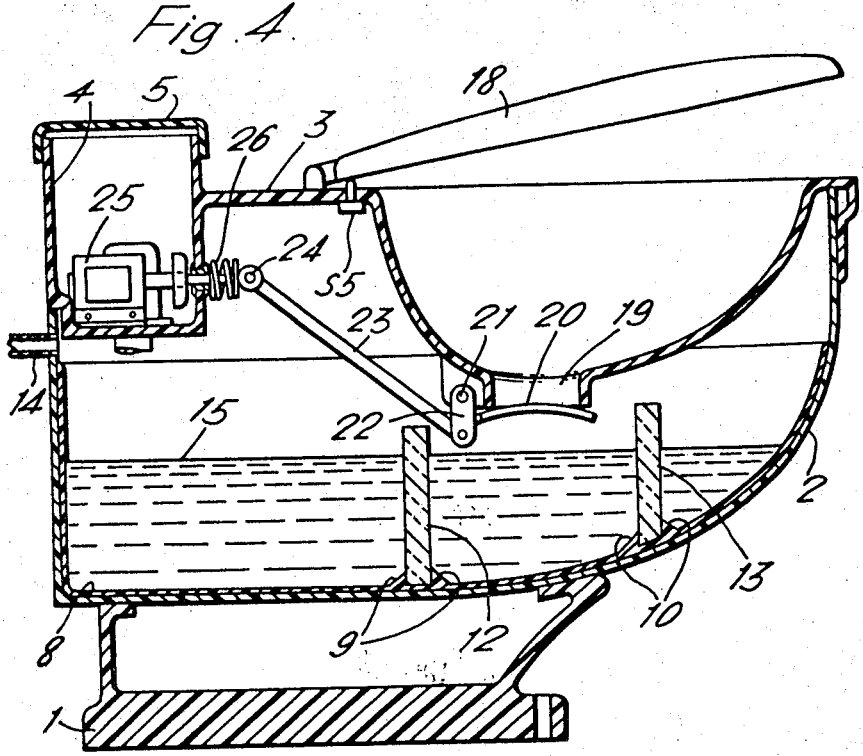
FIG. 4 is a sectional view taken along the line A—A in FIG. 3.

Looking now at FIGS. 1 to 6, and in particular FIG. 4, it will be seen that the apparatus of this invention, the body of which can be formed from a ceramic material or a suitable plastic, includes an appropriate shaped base 1 to which there is secured an appropriately shaped reservoir 2 which is capped with a removable, combined bowl and reservoir cover 3 provided with a generally rectangular rear chamber 4 which is covered with a removable cap 5.

Located within the reservoir 2 is a removable, plastic liner 8 shaped so as to conform to the interior of the lower portion of the reservoir 2. This liner is removable for cleaning as necessary by first removing the removable bowl and cover 3 which, as is shown, rests on, and may be detachably secured to the reservoir 2.

Figure 5:
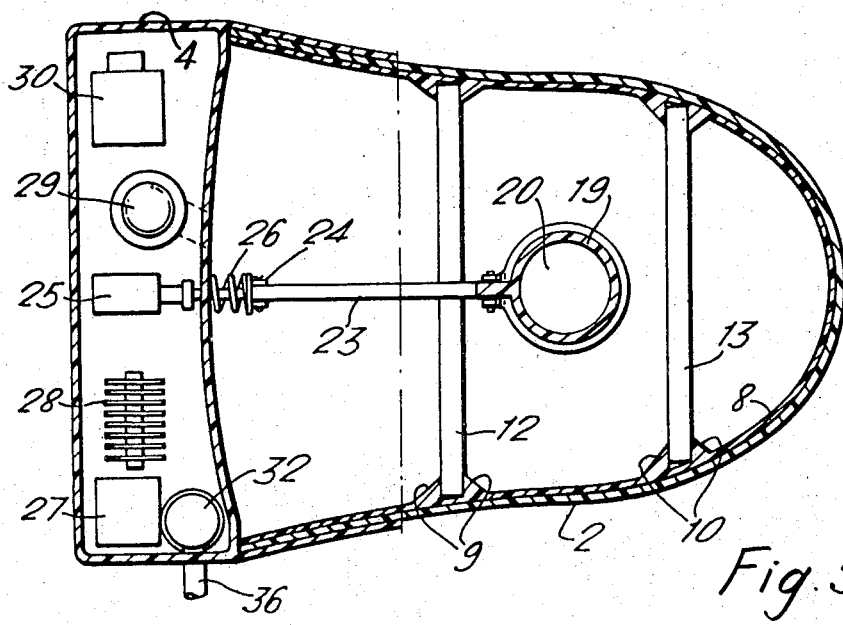
FIG. 5 is a sectional view taken along the line C—C in FIG. 1.

Looking also at FIG. 5, it will be seen that two pairs of parallel beads 9 and 10 are integrally formed in the interior of the liner so as to stand proud of its inner surface. Each pair of beads extends transversely of the length of the liner and from one edge of the liner to the other. Also each of the pairs of beads 9 and 10 is spaced apart a distance sufficient to permit a pair of flat plate-like graphite electrodes 12 and 13 of suitable outline, to be slid into position in the liner between their respective pairs of beads 9 and 10 where they will be maintained in a vertically upright position as shown in FIG. 4 by means of their respective beads. Suitable electrodes are available from the National Graphite Company as grade number AG-SR in Welland, Ontario.

A vent 14 is provided at the back of the reservoir 2 above the normal liquid level 15, the vent normally discharging to the atmosphere outside of the vehicle in which the apparatus is located.

The bowl and reservoir cover 3 has hingedly secured to it, in a conventional manner, a bowl cover 18. An aperture 19 is formed in the bottom of the bowl with there being a trap 20 hingedly secured to the bowl at 21 so as to be capable of opening downwardly. A toggle 22 is connected to the trap 20 and in turn has connected to it one end of a control arm 23, whose other end is connected at 24 to a solenoid 25 which is spring-biased by a spring 26 so that when the solenoid 25 is inactive, compression spring 26 through control arm 23 and toggle 22 maintains trap 20 in its closed position as shown in FIG. 4.

Figure 6:
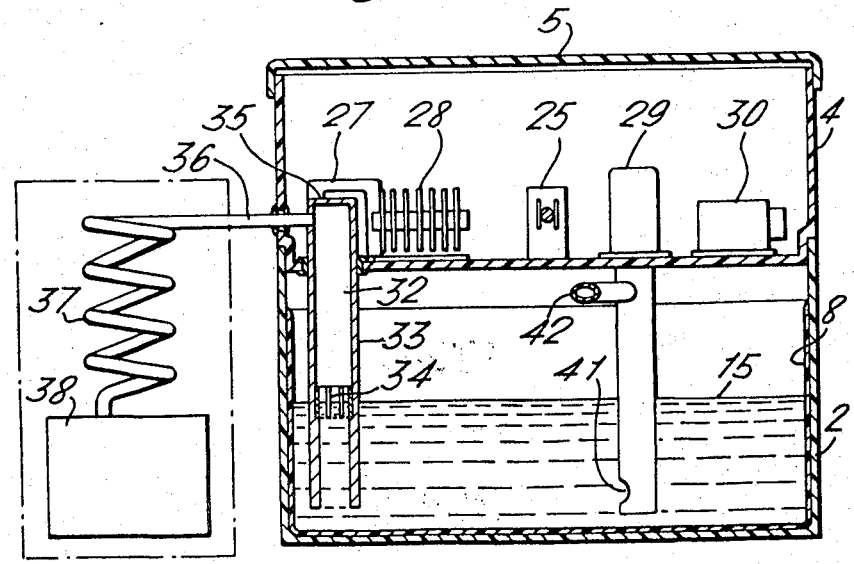
FIG. 6 is a sectional view taken along the line B—B in FIG. 1.

Looking now in particular at FIGS. 5 and 6, it will be seen that in addition to the solenoid 25 which is located in the chamber 4, there is also located in this chamber a transformer 27 (Hammond, Ser. No. 210–A—primary 115 volts—secondary 7,0,7 volts), a full wave silicone rectifier 28 (Sarks Tarzian 5 RAN P.I.V., 50 volts, 20 amps. and a timer 30.

Referring to FIG. 6, there is shown an evaporator 32 consisting of a vertical tubular member 33, within which there is fixed a pair of parallel evaporator plates 34, is located partially within the reservoir 2 with its upper, closed end 35 projecting upwardly through and above the floor of the chamber 4. Adjacent the end 35 there is provided a water vapor outlet 36 which if necessary, as shown in FIG. 6, can lead to a condensing coil 37 and a condensate reservoir 38, the coil 37 and reservoir 38 being optional in some installations and mandatory in others, depending upon the governing laws and the type of vehicle in which
} the device is mounted. A seal is provided between the tubular member 33 and the floor of chamber 4 where the member passes through the floor and another seal is provided where the outlet 36 of the evaporator 32 passes through the wall of chamber 4. The places 34 are so positioned in the evaporator that they serve to maintain the liquid level 15 in the reservoir 2 simply by being located at the required level. When the liquid in the reservoir reaches the plates and with a voltage being applied to the plates, evaporation continues until such time as the liquid in the reservoir falls below the plates 34.

The drive shaft (not shown), of the flush-pump motor 29 located within the chamber 4, projects downwardly through the floor of chamber 4 to a pump located within the pump housing 40 provided with a liquid inlet 41 and an outlet 42, which outlet terminates at an aperture provided in the bowl so that actuation of motor 29 draws liquid from the reservoir 2 and pumps it into the bowl so as to flush it in a conventional manner.

Figure 7:
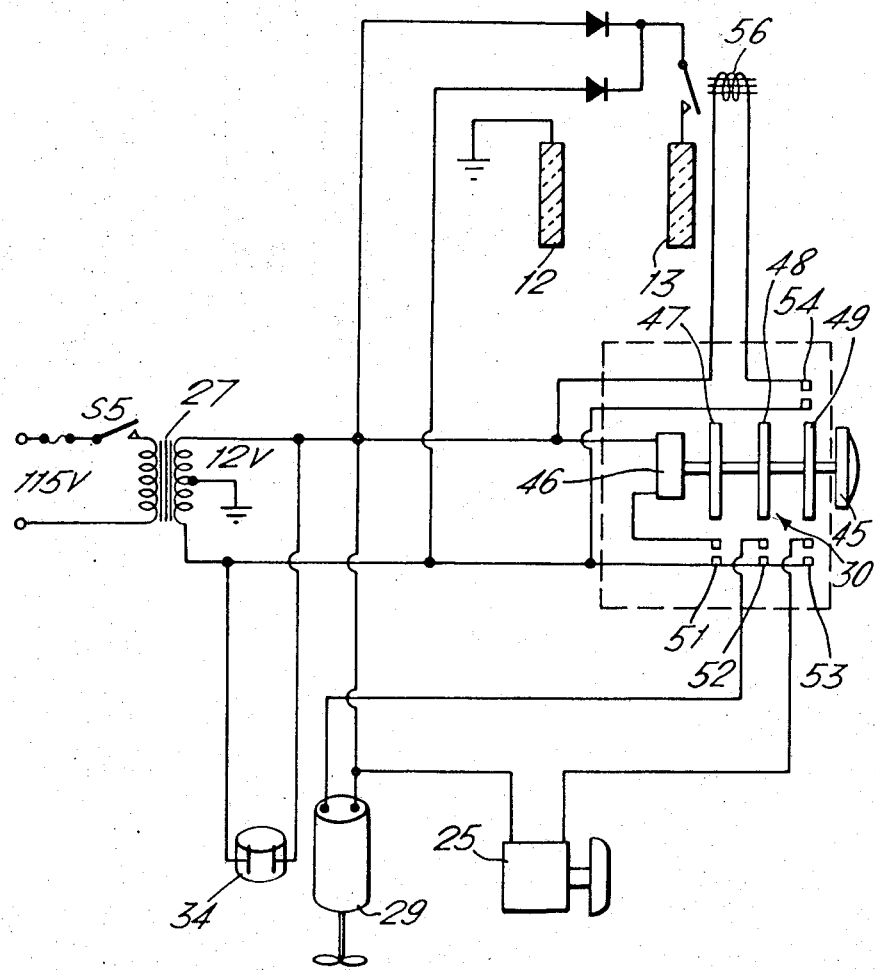
FIG. 7 is a schematic wiring diagram of the apparatus of the preferred embodiment of this invention.

The operation of the apparatus is as follows. Initially the reservoir is charged through the bowl's aperture 19 with the trap open, with an appropriate volume of electrolyte which, for example, can consist of water and NaCl, sodium chloride. As shown in FIG. 7, the apparatus is connected to a 115 volt power source, although it will work equally well on 12 volt D.C. or 24 volt D.C., as normally found in boats or aircraft. The transformer 27 in this instance isolates the apparatus from the 115 volt line so as to reduce the voltage to about 12 volts, this being for personal safety. Also to avoid any possibility of shock, all components are grounded. Seat switch S5 is closed when the bowl cover 18 is down. When the cover is raised all power to the apparatus is cut off.

After use of the apparatus, lowering of the bowl cover energizes the circuit. The timer button 45 is then turned to its ON position which, in a conventional manner, starts the timer motor 46 thereby commencing rotation of timer cams 47, 48 and 49. The sequence of operation of the timer 30 is as follows.

When the timer button 45 is turned on, switches 51, 52 and 53 are closed by cams 47, 48 and 49 respectively. Switch 52, which controls the flush pump motor 29, is held closed by its cam 48 for 45 seconds and is then allowed to open thus terminating the flush cycle. Switch 51 controls the timer motor and this switch is held closed by its cam 47 for its full 30 minute cycle of operation, after which switch 51 is allowed to open so as to terminate the timer's operation. Cam 43 controls both switches 53 and 54. When the timer is turned on, switch 53 is closed so as to energize solenoid 25 which opens the trap to clear the bowl. Switch 53 is held closed for approximately 90 seconds. Then the switch is permitted to open, closing the trap, and switch 54 is closed. This energizes the rectifier circuit through relay 56 so as to provide direct current to the electrodes 12 and 13 thereby commencing the electrolytic action in the reservoir 2, which action continues for the remainder of the timer cycle, that is for a total of approximately 28 minutes and 30 seconds.

The unit is designed so as to have a dry bowl when being used as a result of the caustic nature of the electrolyte used, thereby to avoid any possibility of danger to the user.

It will be understood that, as is known, the electrolytic action in the reservoir breaks down and degrades the sewage and generally disinfects and decontaminates it so as to provide a relatively pure gaseous and liquid effluent and the liquid effluent can be ultimately boiled off by the evaporator.

We claim:

1. A combined toilet and sewage treatment apparatus comprising a bowl provided with a drainage aperture; an electrolyte reservoir in fluid-flow communication with said bowl; means for circulating electrolyte between said bowl and said reservoir to flush said bowl, the electrolyte, during circulation, passing through said drainage aperture to said reservoir; a pair of electrolysis electrodes positioned in said reservoir so that when current is supplied to said electrodes, electrolysis of sewage in the electrolyte occurs; and means for evaporating fluid from the electrolyte and discharging the evaporated fluid exteriorly of the apparatus.

2. The apparatus of claim 1 wherein the reservoir is located below said bowl, and said electrodes consist of a pair of substantially parallel plates, one being located below and to either side of said aperture so that effluent discharged through said aperture falls between said plates.

3. The apparatus of claim 1 wherein said evaporating means consists of an electrically energized parallel plate evaporator, the plates of the evaporator being located within the reservoir at a position so as to maintain a predetermined level of electrolyte in the reservoir.

4. The apparatus of claim 3 further provided with a condenser for the evaporated fluid and means for collecting the condensate.

References Cited

UNITED STATES PATENTS

| | | | |
|---|---|---|---|
| 1,432,740 | 10/1922 | LeBlanc | 4—118UX |
| 2,700,775 | 2/1955 | Martin | 4—118 |
| 3,067,433 | 12/1962 | Dietz et al. | 4—78 |
| 3,329,974 | 7/1967 | Belasco et al. | 4—10 |
| 3,401,115 | 9/1968 | Meyer et al. | 4—10 |

LAVERNE D. GEIGER, Primary Examiner

J. H. DODGE, Assistant Examiner

U.S. Cl. X.R.

4—1